Figure 1:
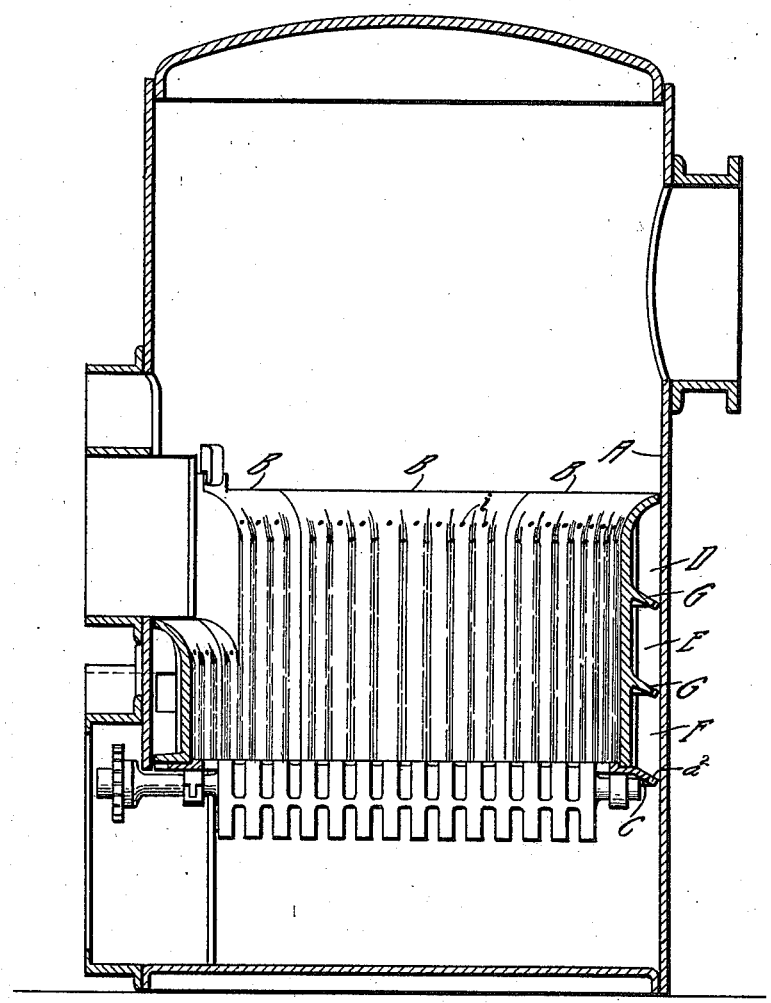

F. MEYER & G. HARMS.
DIME SAVINGS & TRUST CO. AND G. F. MEYER, EXECUTORS OF F. MEYER, DEC'D.
FURNACE.
APPLICATION FILED MAY 9, 1910.

1,011,132.

Patented Dec. 5, 1911.

2 SHEETS—SHEET 1.

F. MEYER & G. HARMS.
DIME SAVINGS & TRUST CO. AND G. F. MEYER, EXECUTORS OF F. MEYER, DEC'D.
FURNACE.
APPLICATION FILED MAY 9, 1910.
1,011,132.
Patented Dec. 5, 1911.
2 SHEETS—SHEET 2.
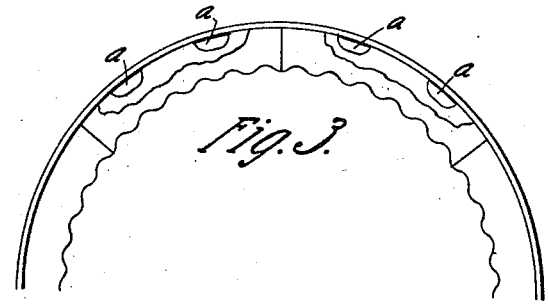
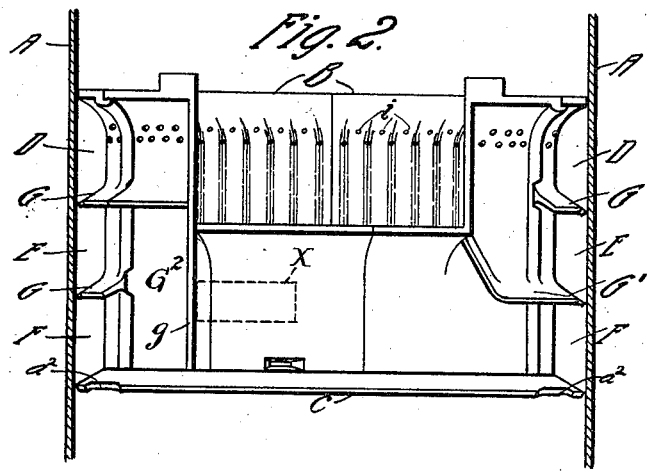
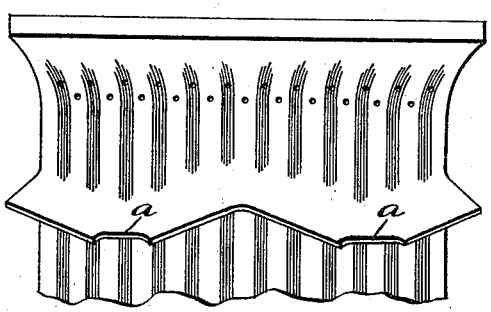

UNITED STATES PATENT OFFICE.

FRANK MEYER AND GEORGE HARMS, OF PEORIA, ILLINOIS; DIME SAVINGS & TRUST CO. AND GEORGE F. MEYER EXECUTORS OF SAID FRANK MEYER, DECEASED.

FURNACE.

1,011,132.      Specification of Letters Patent.      Patented Dec. 5, 1911.

Application filed May 9, 1910. Serial No. 560,337.

*To all whom it may concern:*

Be it known that we, FRANK MEYER and GEORGE HARMS, citizens of the United States, residing at Peoria, in the county of Peoria and State of Illinois, have invented certain new and useful Improvements in Furnaces, of which the following is a specification.

Our invention relates to improvements in furnaces.

The object of the invention is to provide inclined deflector partition walls in conjunction with fire pot sections adapted to produce a circulating space thereabout, said inclined deflector partition walls inclosing circulating spaces and being provided with marginal openings so that ashes will be deflected from the partitions and finally escape into the ash pit.

Practice has demonstrated in connection with furnaces of the type disclosed in patent to Frank Meyer and George Harms #576,135, patented Feb. 2, 1897, that ashes will accumulate upon the partitions, banking up against the furnace walls, thereby shutting off the back surface of the fire pot sections from air contact, resulting in their quickly burning out. It is to avoid this difficulty and to provide for a perfect withdrawal of the ashes from the air circulating chamber that our invention has been made.

Referring to the drawings, Figure 1 is a vertical sectional view of a furnace, containing fire pot sections formed and arranged in connection with the casing of a furnace to provide air circulating ducts; Fig. 2 is a side elevation of a fire pot and showing its position in relation to the furnace casing. Fig. 3 is a detail view in plan showing in diagram the manner of placing the fire pot sections and also the disposition of outlet openings from the air circulating chamber, and Fig. 4 is a front elevation showing a portion of a fire pot section.

In the drawings A is the cylindrical casing of the furnace; B are fire pot sections; C is a ring adapted to be supported at the base of the fire pot and to constitute the support for the fire pot sections. Air passageways or rather an air passageway is formed about the fire pot by the provision of partitions extending laterally from the rear walls of the fire pot sections. G refers generally to these partition walls, the same having a general downward incline for the purpose of deflecting ashes toward their outer edges. The air passageway begins at the front of the furnace and just below the fire door opening, into which air is admitted through inlet duct which we have indicated as X, the same being shown in dotted lines in Fig. 2. The air entering beneath the fire door is passed into duct F, section G′ being so formed with the dividing partition extending upwardly to the fire door opening, as to deflect the air into duct F, the air passing around the fire pot, emerging into air space $G^2$ which is separated from the air space beneath the furnace opening by means of partition $g$. The air passes from air space $G^2$ into duct E, passing around the fire pot and from thence into air passageway or duct D, and in again passing around the fire pot is drawn through perforations $i$ to furnish combustible gas to the interior of the fire pot.

Our invention has to do particularly with the formation of the dividing partition walls C and G. The walls G are formed with the downward incline as shown in Figs. 1 and 2 and each is provided with marginal openings as $a$ and the walls are curved upwardly at the middle portions of the sections as shown in Fig. 4, and also with the upwardly inclined portions bearing toward the edges of the sections adapted to meet the edges of adjacent fire pot sections, which have similar inclined parts leading to the marginal openings $a$. Base ring C or wall is also provided with marginal openings $a^2$.

In the use of the furnace for heating purposes, ashes will sift through into the air passageways but by forming the partition walls in the manner shown and described, such ashes will not accumulate but will be deflected to the openings $a$ in walls G and will be sifted from one circulating compartment to the other, and finally through the marginal openings $a^2$ in base ring C. Furthermore, the withdrawal of the ashes from the circulating spaces is promoted by the draft of the furnace as the natural combustion suction would cause a little downward draft through openings $a$ and $a^2$, which will be sufficient to withdraw light ash particles but not sufficiently strong to interfere with the normal circulation of air about and through the air passageways.

What we claim is:

1. In combination, an inclosing casing, a fire pot within said casing and above the bottom thereof, that portion of the casing below said fire pot forming an ash pit, inclined partitions extending outwardly and downwardly from the fire pot to the casing provided with marginal openings and their upper surfaces formed to incline to said openings, said partitions being arranged in a relation to form an air circulating duct and a base ring upon which the fire pot rests extending outwardly and downwardly to the casing and provided with a series of marginal openings in the edge thereof, the upper surface of said base ring being formed to incline to said openings, whereby the inclination of the partitions forming the air circulating duct will cause gravitation of ashes toward and through the marginal openings to be finally deposited in the ash pit.

2. In combination an inclosing casing, a fire pot within said casing and above the bottom thereof, that portion of the inclosing casing below said fire pot forming an ash pit, inclined partitions extending outwardly and downwardly from the fire pot to the casing, arranged in a relation to form a circulating duct and provided with a series of openings in the outer edges thereof, and a base ring upon which the fire pot rests, extending outwardly and downwardly to the casing and provided with a series of openings in the edge thereof, whereby the series of openings in the outer edges of the partitions and the base ring will permit the escape of ashes from the air circulating duct into the ash pit.

In testimony whereof we have affixed our signatures in presence of two witnesses.

FRANK MEYER.
GEORGE HARMS.

Witnesses:
C. H. HAGEMEYER,
GEO. T. MEYER.

---

Copies of this patent may be obtained for five cents each, by addressing the "Commissioner of Patents, Washington, D. C."